(12) United States Patent
Panjer et al.

(10) Patent No.: US 12,466,563 B2
(45) Date of Patent: Nov. 11, 2025

(54) METHOD AND SYSTEM FOR OPERATION OF SAFETY FEATURES OF AIRCRAFT GALLEY CONTAINERS

(71) Applicant: B/E Aerospace, Inc., Winston Salem, NC (US)

(72) Inventors: Frederik Adrian Stephan Panjer, Maarsbergen (NL); Arnau Castillo Gonzalez, Maarssen (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 191 days.

(21) Appl. No.: 18/307,186

(22) Filed: Apr. 26, 2023

(65) Prior Publication Data

US 2023/0399105 A1    Dec. 14, 2023

(30) Foreign Application Priority Data

Jun. 9, 2022  (EP) ..................................... 22178257
Oct. 6, 2022  (EP) ..................................... 22199943

(51) Int. Cl.
*B64D 11/04* (2006.01)
*E05B 47/00* (2006.01)
(Continued)

(52) U.S. Cl.
CPC .............. *B64D 11/04* (2013.01); *E05B 47/00* (2013.01); *E05B 65/0042* (2013.01);
(Continued)

(58) Field of Classification Search
CPC ..... B64D 11/04; E05B 47/00; E05B 65/0042; E05B 65/005; E05B 77/54; E05B 83/22;
(Continued)

(56) References Cited

U.S. PATENT DOCUMENTS 4,055,317 A    10/1977  Greiss
4,892,338 A     1/1990  Weinerman et al.
(Continued)

FOREIGN PATENT DOCUMENTS

EP          3878747          9/2021

OTHER PUBLICATIONS

European Patent Office, European Search Report dated Nov. 14, 2022 in Application No. 22178257.6.
(Continued)

*Primary Examiner* — Christine M Mills
*Assistant Examiner* — Yahya Sidky
(74) *Attorney, Agent, or Firm* — SNELL & WILMER L.L.P.

(57) ABSTRACT

There is provided herein an aircraft including at least one aircraft galley container and a controller. Each one of the at least one aircraft galley container includes a safety feature having a first mode and a second mode, and a controller for automatically selecting one of the first mode and second mode of the safety feature and placing the safety feature in the selected mode. The automatic selection of the mode is dependent on a condition of the aircraft satisfying or failing to satisfy a predetermined condition. There is also provided a method of operating a safety feature of an aircraft galley container.

14 Claims, 10 Drawing Sheets

(51) Int. Cl.
  *E05B 65/00* (2006.01)
  *E05B 77/54* (2014.01)
  *E05B 83/28* (2014.01)
  *E05B 85/22* (2014.01)
  *E05C 9/04* (2006.01)

(52) U.S. Cl.
  CPC ............ *E05B 65/005* (2013.01); *E05B 77/54* (2013.01); *E05B 83/28* (2013.01); *E05B 85/22* (2013.01); *E05C 9/045* (2013.01); *E05B 2047/0054* (2013.01); *E05B 2047/0067* (2013.01)

(58) Field of Classification Search
  CPC ............ E05B 85/22; E05B 2047/0054; E05B 2047/0067; E05C 9/045
  See application file for complete search history.

(56) References Cited

U.S. PATENT DOCUMENTS

| | | | | |
|---|---|---|---|---|
| 5,072,974 | A * | 12/1991 | Henne | E05C 19/022 |
| | | | | 292/201 |
| 6,357,806 | B1 * | 3/2002 | Saku | B64D 11/0007 |
| | | | | 70/432 |
| 6,490,895 | B1 * | 12/2002 | Weinerman | E05C 9/043 |
| | | | | 292/DIG. 31 |
| 10,669,754 | B2 | 6/2020 | Lizotte | |
| 11,015,817 | B2 | 5/2021 | Klok et al. | |
| 2015/0290795 | A1 | 10/2015 | Oleynik | |
| 2020/0181942 | A1 | 6/2020 | Bauer et al. | |
| 2021/0285268 | A1 * | 9/2021 | Panjer | F24C 15/022 |
| 2024/0167692 | A1 * | 5/2024 | Panjer | E05B 47/02 |

OTHER PUBLICATIONS

European Patent Office, European Search Report dated May 12, 2023 in Application No. 22199943.6.

* cited by examiner

METHOD AND SYSTEM FOR OPERATION OF SAFETY FEATURES OF AIRCRAFT GALLEY CONTAINERS

CROSS-REFERENCE TO RELATED APPLICATIONS

This application claims priority to, and the benefit of, EP Patent Application No. 22178257.6, filed Jun. 9, 2022 entitled "INTEGRATED DOOR LOCK FOR AN AIRCRAFT GALLEY CONTAINER," (hereinafter the '257 application); and claims priority to, and the benefit of EP Patent Application No. 22199943.6 filed Oct. 6, 2022 entitled "METHOD AND SYSTEM FOR OPERATION OF SAFETY FEATURES OF AIRCRAFT GALLEY CONTAINERS" (hereinafter the '943 application). The '257 Application and the 943 application are hereby incorporated by reference in their entirety for all purposes.

FIELD

The present disclosure relates to methods and systems for operating safety features, such as locking and unlocking, of one or more aircraft galley containers (or aircraft galley inserts).

Also included is an integrated door lock for an aircraft galley container (or aircraft galley insert) for example an aircraft galley fridge.

BACKGROUND

Aircraft galley containers, or aircraft galley inserts, sometimes need the option to be locked. This is the case, for example, for aircraft galley refrigerators (or fridges) being used to store alcoholic beverages, when airlines fly to destinations having particular restrictions on alcohol. Similarly, locks may be used on aircraft galley containers (e.g., fridges) to prevent theft of valuable products stored within the aircraft galley containers.

Some previous arrangements to provide such a locking function include external lugs being attached to a door and a housing respectively of an aircraft galley container. These external lugs have aligned apertures configured to be used with a padlock or similar external locking device. These lugs, by extending outwards of the aircraft galley container give rise to potential hazards to the aircraft crew within the aircraft cabin, for example, during taxi, take-off, turbulence or landing of the aircraft, as well as in use of the aircraft galley container. Additionally, the external lugs could be broken off from outside the aircraft galley container, weakening the security of the lock.

There is a desire to provide an improved aircraft galley container having a secure locking function that does not give rise to said hazards.

Furthermore, there is a desire to reduce the input required from pilots or cabin crew to operate safety features, such as the locking function above, associated with aircraft galley containers.

SUMMARY

From one aspect, there is provided an aircraft including at least one aircraft galley container and a controller. Each one of the at least one aircraft galley container includes a safety feature having a first mode and a second mode. The controller is for automatically selecting one of the first mode and second mode of the safety feature and for placing the safety feature in the selected mode. The automatic selection of the mode is dependent on a condition of the aircraft satisfying or failing to satisfy a predetermined condition.

The at least one aircraft galley container may include a plurality of aircraft galley containers.

The safety feature may include a remotely operable locking mechanism, wherein the first mode includes a locked position of the locking mechanism and the second mode includes an open position.

The predetermined condition may include a predetermined set of geographical locations of the aircraft.

The condition may include a flight state including docked, taxiing, take-off, climb, descent, landing, and cruise states, wherein the predetermined condition is satisfied when the aircraft is in one of the taxiing, take-off, climb, descent, and landing states and the predetermined condition is not satisfied during the docked and cruise states.

The at least one aircraft galley container may include a door, a latch mechanism and a lock. The latch mechanism is positionable in a latched position preventing opening of the door and an unlatched position permitting opening of the door. The latch mechanism includes a handle, a pair of rods and a rotatable plate. The rotatable plate is coupled to the handle and configured to be rotated by the handle and to convert rotational movement of the handle to linear movement of the pair of rods to place the latch mechanism in the latched and unlatched positions. The lock is configured to selectively prevent the rotatable plate from rotation to maintain the latch mechanism in the latched position. The locking mechanism includes the lock. In the locked position the lock prevents the rotatable plate from rotation and in the open position the lock permits the rotatable plate to rotate.

The aircraft galley container may be an oven and the safety feature may include a self-cleaning module for the oven, wherein the first mode includes the self-cleaning module being operable and the second mode includes the self-cleaning module being inhibited.

In the aircraft galley container of the above, and in other aircraft galley containers described herein, the predetermined condition may include a turbulence threshold of the aircraft.

The turbulence threshold may correspond to an amount of vertical change of altitude of an aircraft in a set amount of time, optionally taking into account and/or adjusted by an expected change of altitude corresponding to flight controls and/or phase of flight.

The aircraft may further include a sensor for determining which mode each safety feature is in, and a display module for indicating to a user which mode each safety feature is in.

The aircraft may include a manual input configured to override the controller when a user provides an input signal.

From another aspect, there is provided a method of operating at least one safety feature associated with a respective at least one aircraft galley container. The method includes: determining whether an aircraft satisfies a predetermined condition; when the aircraft does satisfy the predetermined condition, placing a safety feature of at least one aircraft galley container in a first mode; and when the aircraft fails to satisfy the predetermined condition, placing the safety feature of the at least one aircraft galley container in a second mode.

Placing the safety feature in a respective mode includes maintaining the safety feature in said mode if the safety feature is already in that mode.

In examples of the above method, the at least one aircraft galley container may include a plurality of aircraft galley containers, and the steps of placing the safety feature of the at least one aircraft galley container in the first and second modes includes placing the safety features of each of the plurality of aircraft galley containers in the first and second modes respectively.

In examples of any of the above methods, the safety feature may include a remotely operated locking arrangement. The first mode may include a locked condition of the locking arrangement and the second mode may include an open condition of the locking arrangement.

In examples of any of the above methods, the predetermined condition may include a set of geographical locations of the aircraft.

In examples of any of the above methods, the at least one aircraft galley container may be an oven and the safety feature may include a self-cleaning module for the oven, wherein the first mode includes the self-cleaning module being on and the second mode includes the self-cleaning module being off, wherein the predetermined condition includes turbulence threshold of the aircraft.

From another aspect, there is provided an aircraft galley container including a door, a latch mechanism, and a lock. The latch mechanism is positionable in a latched position preventing opening of the door and an unlatched position permitting opening of the door. The latch mechanism includes a handle, a pair of rods and a rotatable plate. The rotatable plate is coupled to the handle and configured to be rotated by the handle and to convert rotational movement of the handle to linear movement of the pair of rods to place the latch mechanism in the latched and unlatched positions. The lock is configured to selectively prevent the rotatable plate from rotation to maintain the latch mechanism in the latched position.

The aircraft galley container may be a refrigerator.

The lock may include a rotatable locking member rotatable between a locking position and an open position.

The locking position may be disposed at 90° from the open position.

The lock may include a linearly translatable locking member translatable between a locking position and an open position.

The rotatable plate may include a recess, wherein the locking member is disposed within the recess when in the locking position and is displaced from the recess when in the open position.

The recess may be a slot disposed between front and back surfaces of the rotatable plate.

Alternatively, the recess may be a through hole. The through hole may extend from an outer periphery of the rotatable plate to a track of the plate for engaging the rod.

Alternatively, the recess may extend across the entire thickness of the rotatable plate.

The locking member may be configured to abut a side edge of the rotatable plate when in the locking position.

The lock may be configured to be operated manually by use of a key.

The lock may be configured to be remotely operated.

The lock may be replaceably removable from the aircraft galley container.

The lock may include a lock housing and one or more fasteners disposed to attach the lock housing to the door.

The door may include a front panel including an aperture in which the lock housing is located and wherein the fasteners are disposed behind the front panel.

The aircraft galley container of any of the above or multiples thereof may be included in the aircraft of the first aspect above and/or used in the method above.

From yet another aspect, there is provided a system including a plurality the aircraft galley containers of any of the above, a control module and a processor. The control module is configured to display a lock status of each of the plurality of aircraft galley containers and to receive inputs from a user to selectively lock or unlock the lock of each aircraft galley container. The processor is configured to detect the lock status of each of the plurality of aircraft galley containers for display on the control module and configured to lock or unlock the lock of each aircraft galley container in response to the inputs from the user.

The system of the above may be included in the aircraft of the first aspect above and/or used in the method above.

The system may be a system for use in an aircraft.

BRIEF DESCRIPTION OF THE DRAWINGS

Various embodiments of this disclosure will now be described by way of example only, with reference to the accompanying drawings in which.

DETAILED DESCRIPTION

Figure 1:
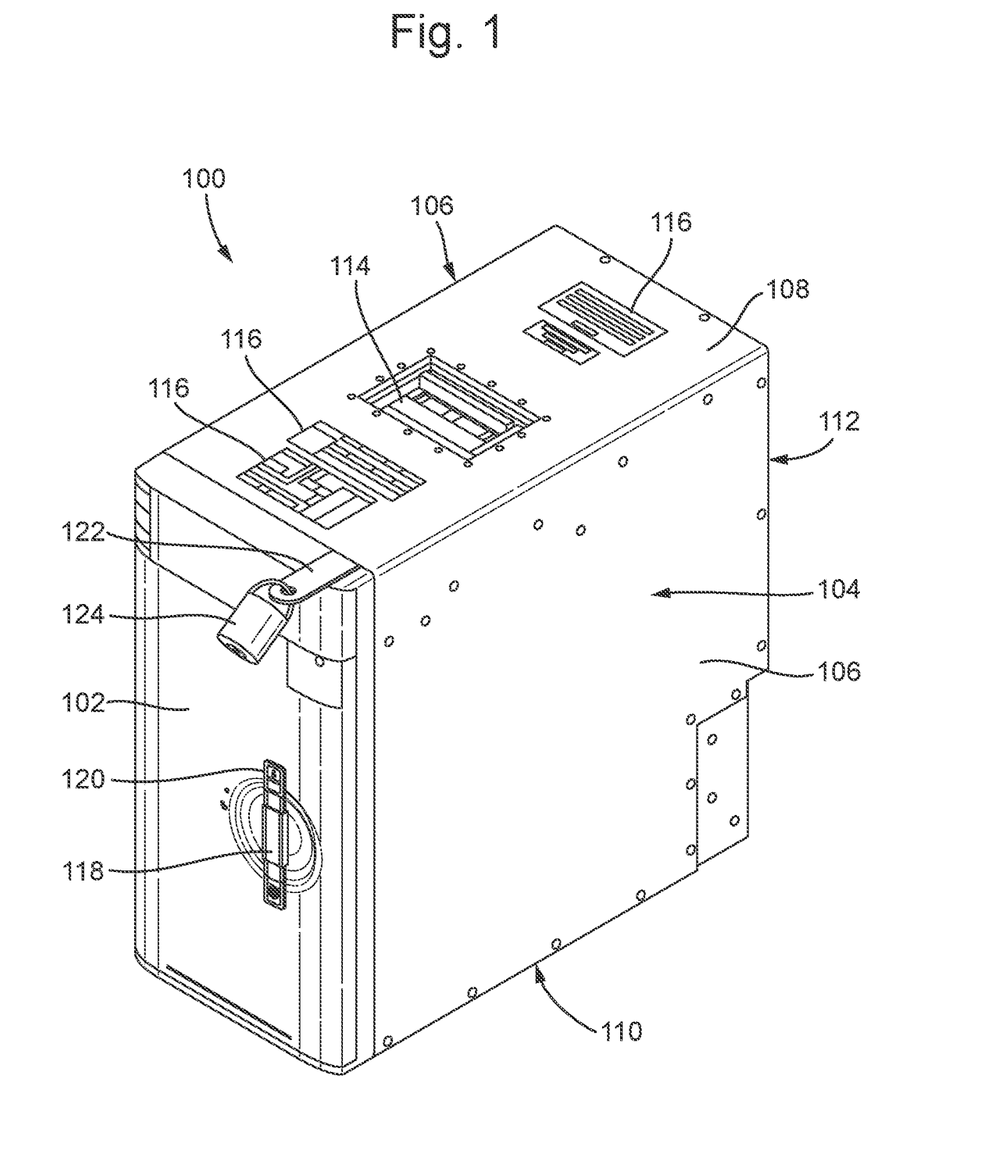
FIG. 1 illustrates a perspective view of a previous aircraft galley container.

With reference to FIG. 1, there is described a previous aircraft galley container 100. The illustrated aircraft galley container 100 is an aircraft galley refrigerator 100 (or an aircraft galley fridge). The aircraft galley container 100 has a door 102 hingedly attached to a storage compartment 104. The storage compartment 104 has side panels 106, a top panel 108, a bottom panel 110 and an aft panel 112. The storage compartment 104 is configured to house a variety of objects, such as alcoholic beverages. As will be appreciated the aircraft galley container 100 may also be used to store other items, such as food, jewellery, or other items sold on an aircraft.

The aircraft galley container 100 may include ancillary features, such as handle 114 or labelling features (labels) 116.

Figure 2A:
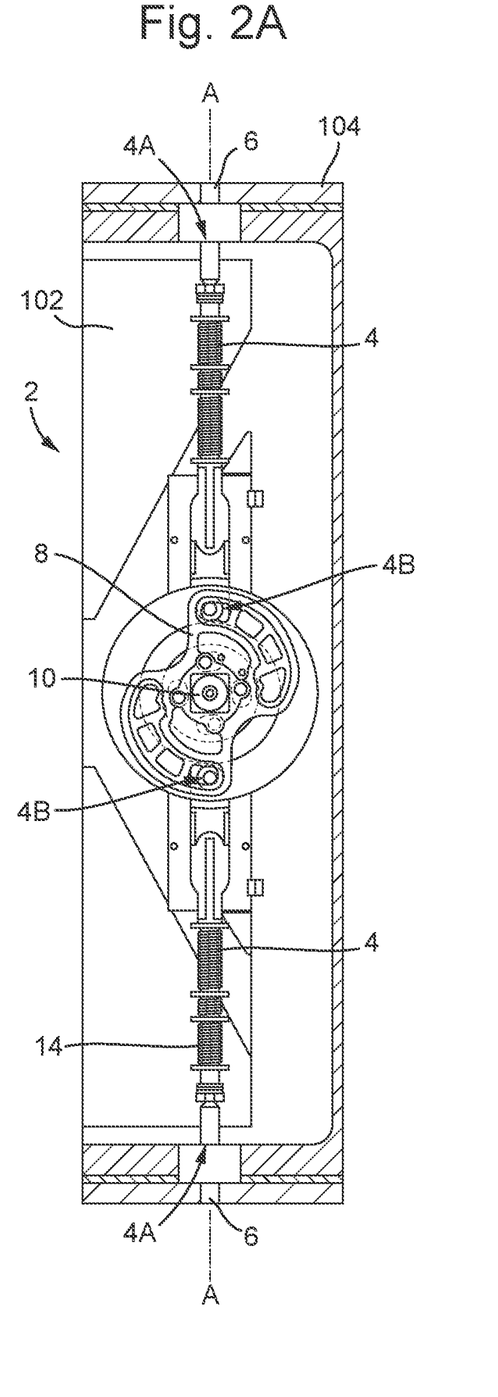
FIGS. 2A and 2B illustrate the operation of a latch mechanism of an aircraft galley container.
Figure 2B:
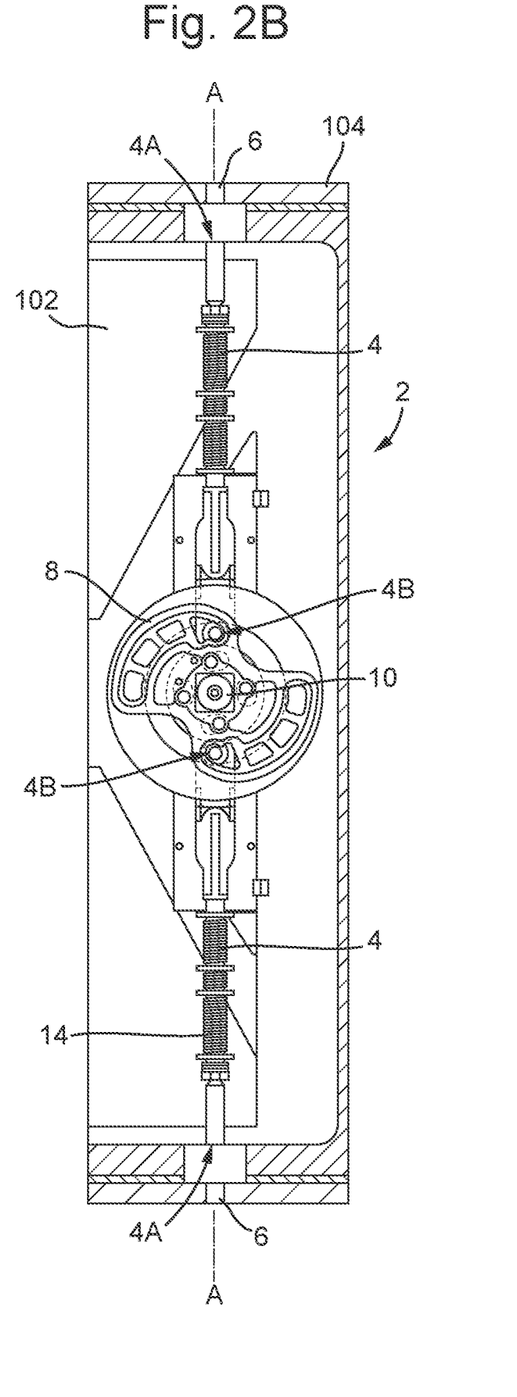

The door 102 has a handle 118, which is operable to selectively unlatch the door 102, by controlling a latch mechanism, as described below, so the container may be opened. The mechanism for unlatching, and latching the door is illustrated in FIGS. 2A and 2B.

The door 102 may also include a secondary latch mechanism (not illustrated) operated by a control 120, such as a button or a lever.

This previous aircraft galley container 100 includes a locking feature in the form of a pair of lugs 122 and a padlock 124. The lugs 122 are attached to the door 102 and the storage compartment 104 respectively, and are arranged such that apertures in each of the lugs 122 are aligned when the door 102 is closed. In the closed position, the padlock 124 is used to lock the door 102 by extending through the apertures in the lugs 122.

The present disclosure, as described below, includes an alternative locking feature to the pair of lugs 122 and padlock 124.

With reference to FIGS. 2A, 2B, 3, 3A and 3B the latch mechanism 2 (or primary latch mechanism) is described. The latch mechanism 2 shown herein is used in each of the aircraft galley container 100 of FIG. 1 and also the aircraft galley container of the disclosure described below with reference to FIGS. 4 to 10. As will be appreciated, the lock of the aircraft galley container of the disclosure is not shown in FIGS. 2A, 2B, 3, 3A and 3B.

The latch mechanism 2 is illustrated in a latched position in FIG. 2A and an unlatched position in FIG. 2B.

The latch mechanism 2 includes a pair of rods 4 having a first end 4A and a second end 4B. As will be appreciated the latch mechanism 2 could function with just a single rod 4, either the upper or lower rod as illustrated. However, a pair of rods 4 as illustrated provides the required strength of the latch mechanism 2 in aircraft galley containers. Each rod 4 is translatable along a rod axis A, which is upwards and downwards as shown in FIGS. 2A and 2B. As will be appreciated, the orientation of the rod axis A may be different to upwards and downwards and the reference to up and down is with respect to the aircraft galley container 100 in normal use.

The latch mechanism 2 includes a pair of holes 6, which may be blind holes, within the storage compartment 104 into which the first ends 4A of the rods 4 can extend. In the latched position (FIG. 2A), the first ends 4A of the rods 4 are located in the holes 6, and in the unlatched position, (FIG. 2B), the first ends 4A of the rods 4 are spaced from the holes 6. As will be appreciated, in the arrangement having only a single rod 4, only a single hole 6 is required. Additionally, grooves or slots could be used in place of the holes 6, provided that when the latch mechanism 2 is in the latched position, the rods 4 engage with the storage compartment 104 to prevent opening of the door 102. The illustrated holes 6 are in the top panel 108 and bottom panel 110 of the storage compartment 104 respectively. However, with an alternative design, the rods could be arranged to extend into and retract out of holes elsewhere in the storage compartment 104.

The latch mechanism 2 also includes a rotatable plate 8, operable to translate the rods 4. The rotatable plate 8 is shown in isolation in FIG. 3.

Figure 3:
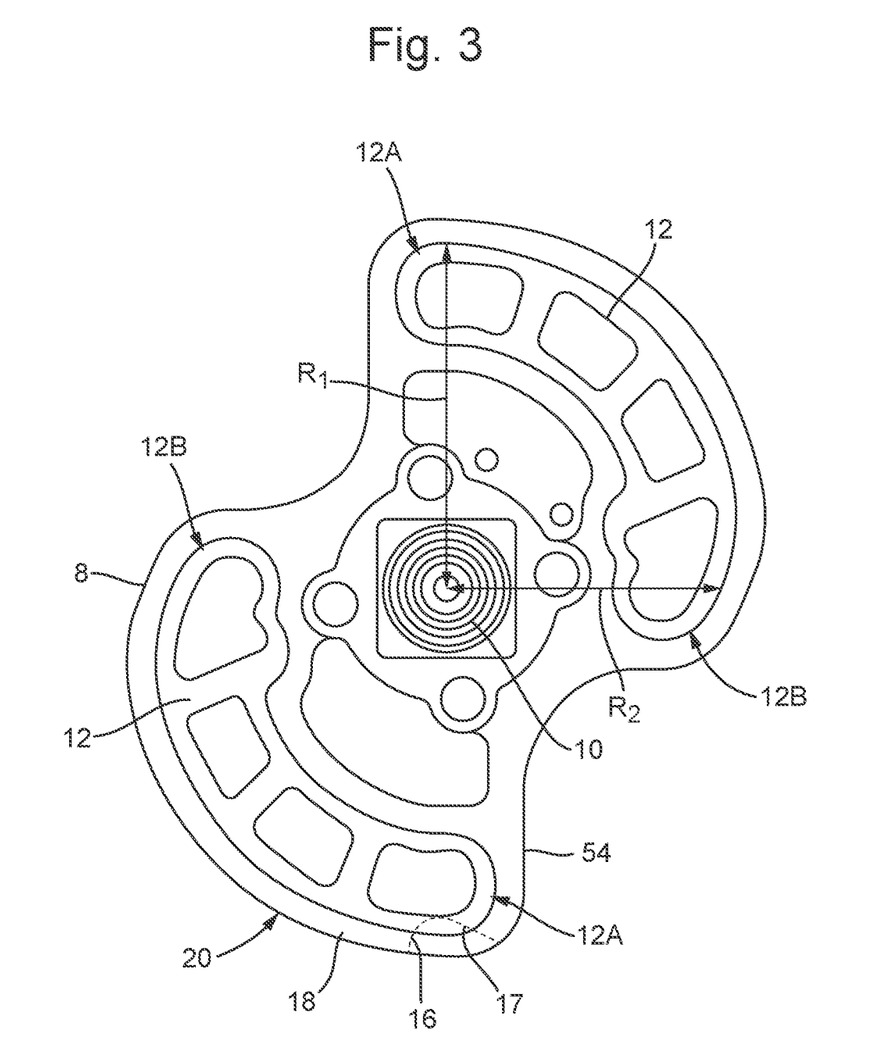
FIG. 3 illustrates a rotatable plate of the latch mechanism in isolation.

The rotatable plate 8 is fixed to the handle 118 by a fastener 10.

The rotatable plate 8 includes a pair of opposed tracks 12 (or there is only a single track when only a single rod 4) engaged with the second ends 4B of the rods 4, for example via a lug that may slide along the track 12. The opposed tracks 12 have a partial spiral shape in that they each include a primary radius R1 at a first end 12A of the track 12 and a secondary radius R2 at a second end 12B of the track 12, wherein the primary radius R1 is larger than the secondary radius R¬2.

When the handle 118 is rotated, the rotational movement is transferred to the rotatable plate 8. As illustrated, the rotatable plate 8 is rotated, upon rotation of the handle 118, in an anticlockwise direction from what is shown in FIG. 2A to what is shown in FIG. 2B.

The rods 4 are maintained in the rod axis A and only translate back and forth along the rod axis A. This means that at the rotatable plate 8 rotated, the second ends 4B of the rods 4 slide along the tracks 12 and are concurrently translated toward the middle of the rotatable plate 8 along the rod axis A.

This causes the first ends 4A of the rods 4 to retract from the holes 6, so as to move the latch mechanism 2 into the unlatched position.

When the rotatable plate 8 is rotated in a clockwise direction as shown, from FIG. 2B to FIG. 2A, the second ends 4B of the rods 4 slide back along the tracks 12 and thereby move to the secondary radius R2. As a result, the first ends 4A of the rods 4 extend into the holes 6, so as to move the latch mechanism 2 into the latched position.

As will be appreciated, the latch arrangement 2 will operate in a similar manner with only a single rod 4, a single hole 6, and a single track 12.

Similarly, the rotatable plate could have an alternative, for example reversed design, to cause the latch mechanism to move into the unlatched position under clockwise rotation and the latched position under anticlockwise rotation.

The illustrated latch mechanism 2 includes resilient members 14, for example, springs, arranged with the rods 4 and configured to bias the latch mechanism 2 into the latched position when the handle is not being moved or held in the position corresponding to the unlatched position or that shown in FIG. 2B.

Figure 3A:
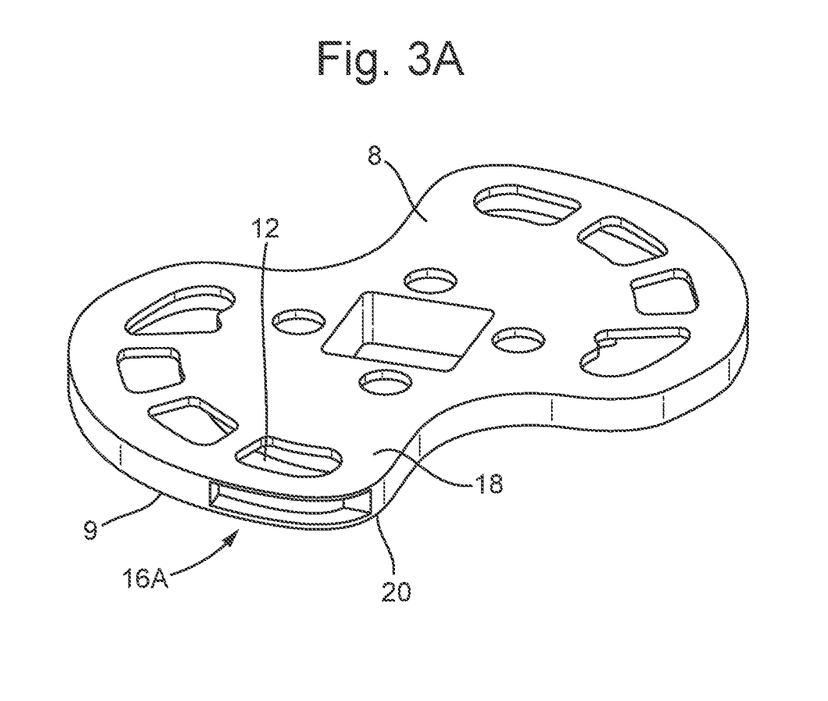
FIG. 3A illustrates another rotatable plate of the latch mechanism in isolation.
Figure 3B:
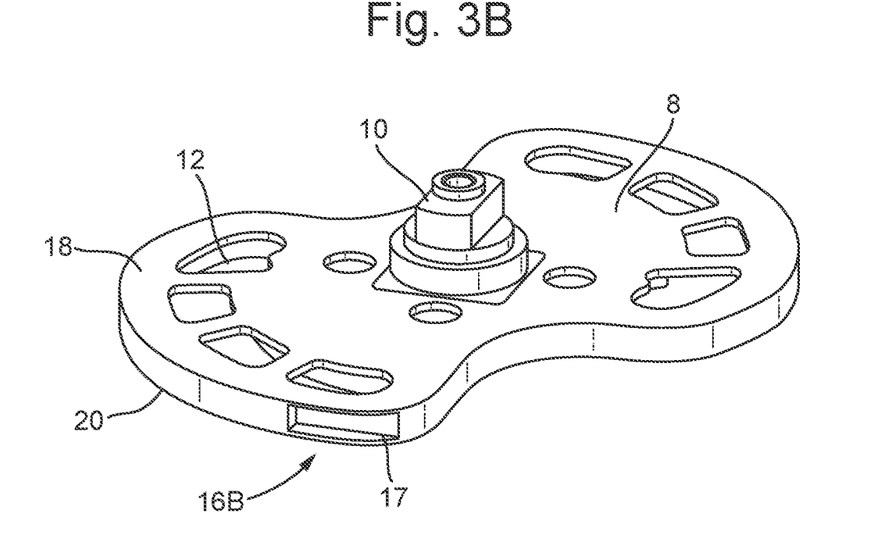
FIG. 3B illustrates yet another rotatable plate of the latch mechanism in isolation.

Also illustrated in the rotatable plate of FIG. 3, and also shown in FIGS. 3A and 3B is a recess 16, 16A, 16B, which may take the form of a slot or a through-hole disposed between front and back surfaces 18, 20 of the rotatable plate 8 or, alternatively may extend across the entire thickness of the rotatable plate 8. The form and function of the recess 16 in relation to the lock will be described further below.

With reference to FIGS. 4 to 10, an aircraft galley container 30 in accordance with the disclosure is described.

Figure 4:
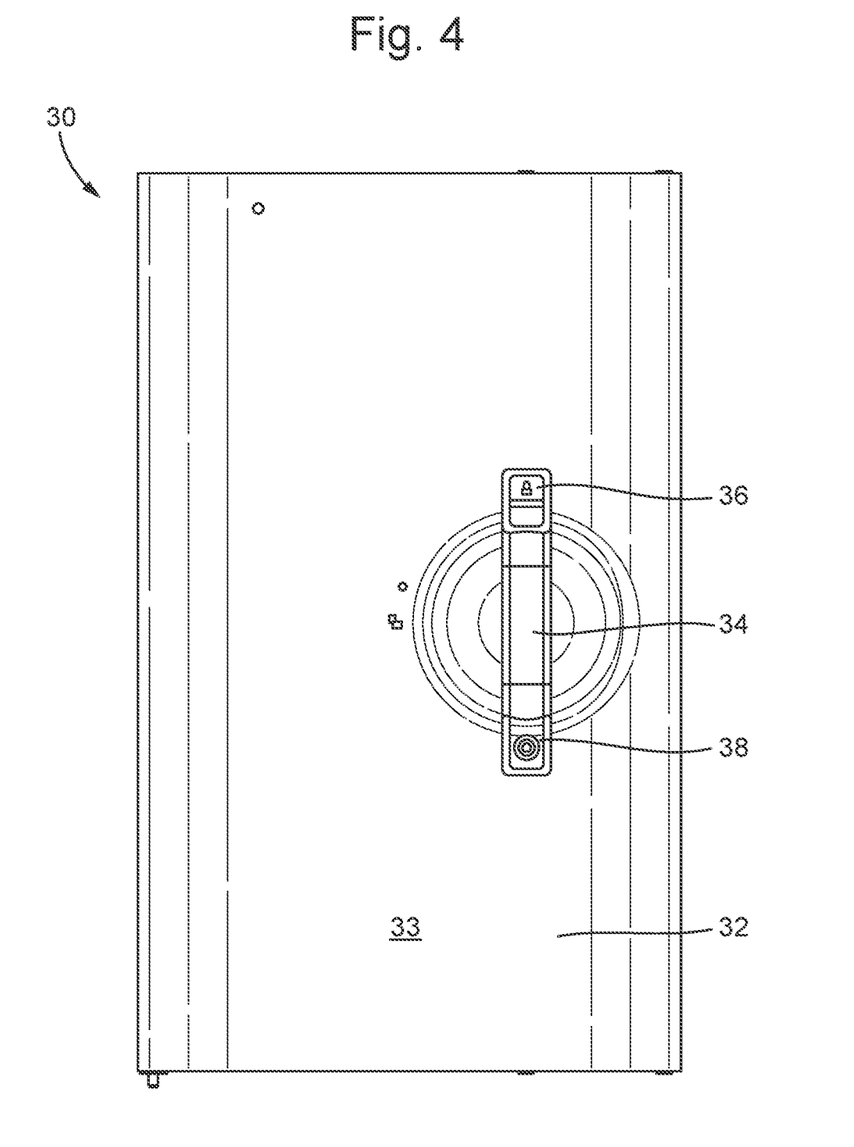
FIG. 4 illustrates a front view of an aircraft galley container in accordance with the disclosure.

Unless described otherwise, in particular with regard to the lock, the aircraft galley container 30 of FIG. 4 has the same features as the aircraft galley container 100 of FIG. 1.

Aircraft galley container 30 has a door 32 which is hingedly attached to a storage compartment and which has a front panel 33. The door 32 has a handle 34, which is configured to control a latch mechanism 2, as shown in FIGS. 2A, 2B and 3. The illustrated aircraft galley container 30 also includes a secondary latch mechanism 36, which is not described at length herein and is not required by the aircraft galley container 30. The secondary latch mechanism 36 includes a lever and a secondary rod, wherein the lever is actuated by a user to move the secondary rod into or out of a hole in the storage compartment to selectively prevent or allow opening of the door 32 respectively.

Aircraft galley container 30 includes a lock 38 integrated into the door 32, and as illustrated, adjacent the handle 34.

The lock 38 is configured to engage with the latch mechanism 2 to selectively allow or prevent movement of the latch mechanism 2 into the unlatched position.

Figure 5:
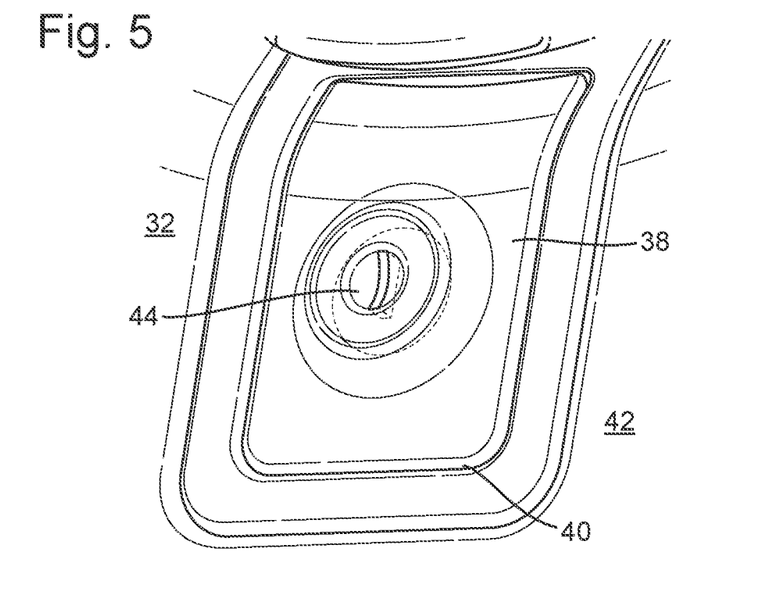
FIG. 5 illustrates a lock disposed in situ within a door of an aircraft galley container.

As shown in FIG. 5, the lock 38 is located within an aperture 40 located in a front panel of the door 32. The aperture 40, and thus, the location of the lock 38 may be adjacent the handle 34, as can be appreciated from FIG. 4.

The lock 38 as shown is configured to be operated manually, by use of a key. This is facilitated by the illustrated keyhole 44, which may take forms other than what is shown in FIG. 5. Alternatively, the lock 38 may be electronically operated, for example by use of stepper motors electrically connected to a controller, a control system, or a control module. The controller, control system or control module may be located remotely from the aircraft galley container 30, for example, in the aircraft cockpit or in the cabin. The controller, control system or control module may include a display indicating the locked or unlocked status of each lockable aircraft galley container 30 in an aircraft, and may also include a means for a user to provide an input to selectively place each of the lockable aircraft galley containers 30 into a locked or unlocked position as desired. The aircraft galley container 30 may include a sensor configured to detect when the door 32 is open or closed and to thereby inform the user by the display on the controller, control system or control module of the open or closed status of the door 32. When the door 32 is open, the lock 38 will not be operable to lock the door 32 in the closed position, so the user knows to only operate the lock 38 when the door 32 is closed, as indicated by the display, showing the output of the sensor.

Figure 6:
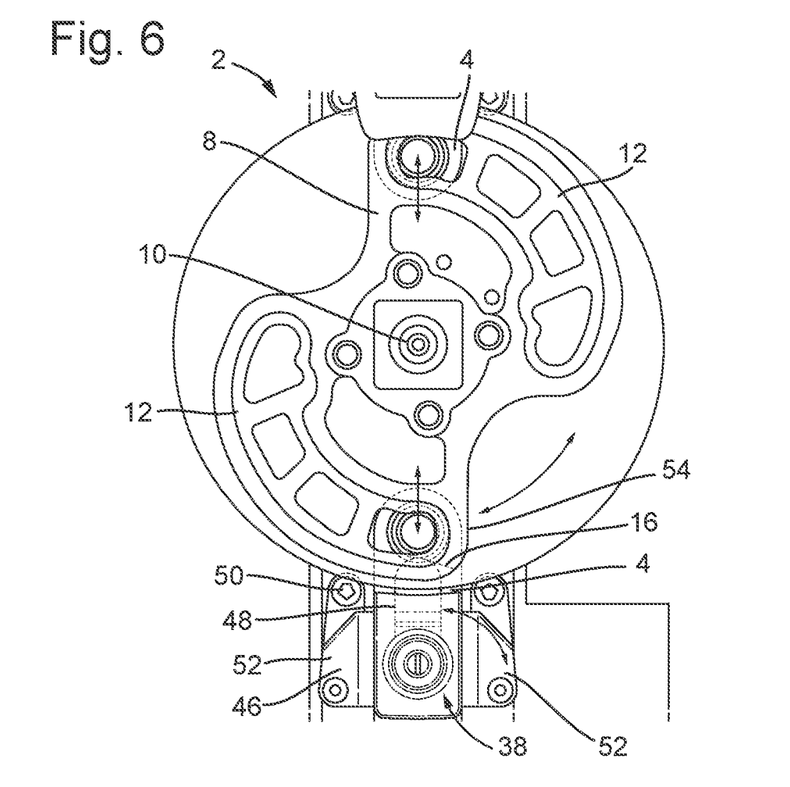
FIG. 6 illustrates a mechanism of a lock and a latch arrangement in accordance with the disclosure, with the lock in a locking position.

With reference to FIG. 6, which shows a view of the latch mechanism 2 and lock 38 from within the door 32, the operating mechanism of the lock 38 is described.

The lock 38 includes a lock housing 46 and a locking member 48. The lock housing 46 is held statically with respect to the door 32, for example by fasteners 50 which attach flanges 52 of the lock housing 46 to the door 32. The lock 38 may thereby be replaceably removable from the aircraft galley container 30. This allows the aircraft operator to select whether or not to use locks 38 on particular flights, and similarly to retrofit locks 38 of this type to existing aircraft galley containers, such as aircraft galley container 100.

Figure 7:
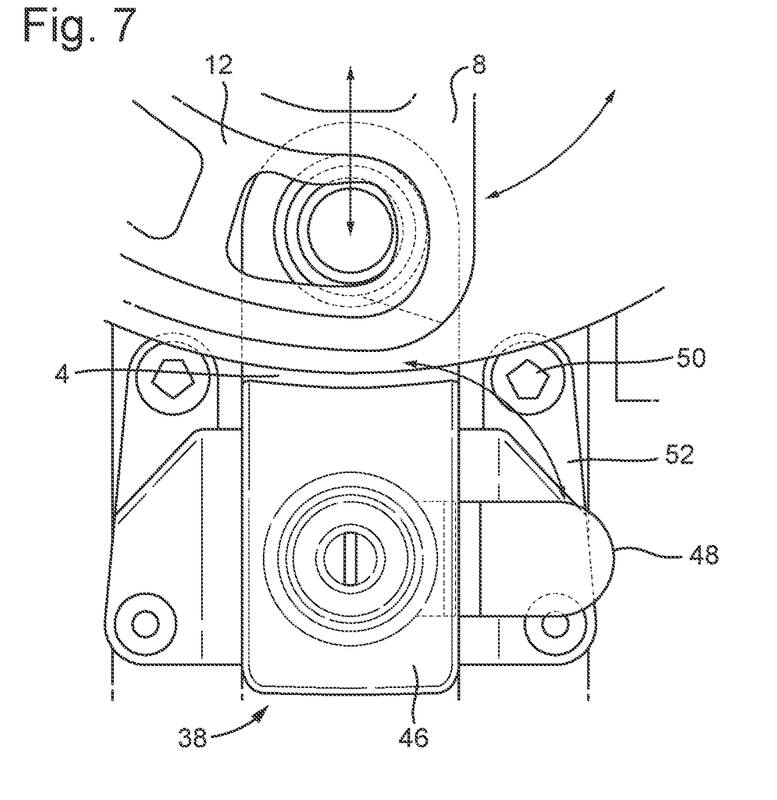
FIG. 7 illustrates a close up view of the lock in an open position.

The locking member 48 is moveable between a locking position (as shown in FIG. 6) and an open position (as shown in FIG. 7). In the illustrated arrangement, this movement is a rotational movement of about 90°; however, this could be a rotational movement of a different magnitude or a linear movement, with another type of lock. That is, in some arrangements, the lock includes a linearly translatable locking member translatable between a locking position and an open position.

The rotatable plate 8 includes a lock engagement feature which engages the locking member 48 when the locking member 48 is in the locked position, to prevent rotation of the rotatable plate 8 out of a position wherein the latch mechanism 2 is in the latched position. The illustrated lock engagement feature is a recess 16 shaped so as to conform to the locking member 48 in the locked position of the locking member 48. The recess 16 may take different forms, for example, those shown in FIGS. 3A and 3B. The recess 16 shown in FIG. 3A is a through hole 16A which extends from an outer periphery 9 of the rotatable plate 8 through to the track 12 which engages one of the rods 4 as described above. The recess 16 shown in FIG. 3B is a slot 16B that extends from the outer periphery 9 of the rotatable plate 8 towards the track 12, but does not extend all the way to the track 12. In this way, the slot 16B has an edge surface 17, which may be angled, as can be appreciated from FIG. 3, to allow movement of the locking member 48 into and out of the locked position. When the locking member 48 is within the slot 16B of FIG. 3B, the slot 16B surrounds the tip of the locking member 48 on every side except for the path which the locking member follows when inserted into the slot 16B.

Neither of the illustrated through hole 16A of FIG. 3A or slot 16B of FIG. 3B extend all the way to front or back surfaces 18, 20 of the rotatable plate. However, it will be appreciated that in some alternative arrangements, the recess 16 may extend across the entire thickness of the rotatable plate 8. When the recess 16 extends across the entire thickness of the rotatable plate 8, the recess 16 does not provide any structure directly forward or directly aft of the locking member 48. In alternative arrangements, the lock 38 may be positioned such that the locking member 48 engages with a side edge 54 of the rotatable plate 8, when in the locked position. In this way, the side edge 54 of the rotatable plate is the lock engagement feature. The side edge 54 is an edge of the rotatable plate 8 within a circular envelope of the rotatable plate 8 and which may be vertical when the rotatable plate 8 as shown in in the latched position. The side edge 54 is the edge of the rotatable plate 8 located in the direction in which the rotatable plate 8 would rotate when moving to the unlatched position.

As illustrated in FIG. 7, when the locking member 48 of the lock 38 is in the open position, the rotatable plate 8 is able to rotate and thereby to translate the rods (or rod) along the rod axis to thus move the latch mechanism 2 into the unlatched position.

Figure 8:
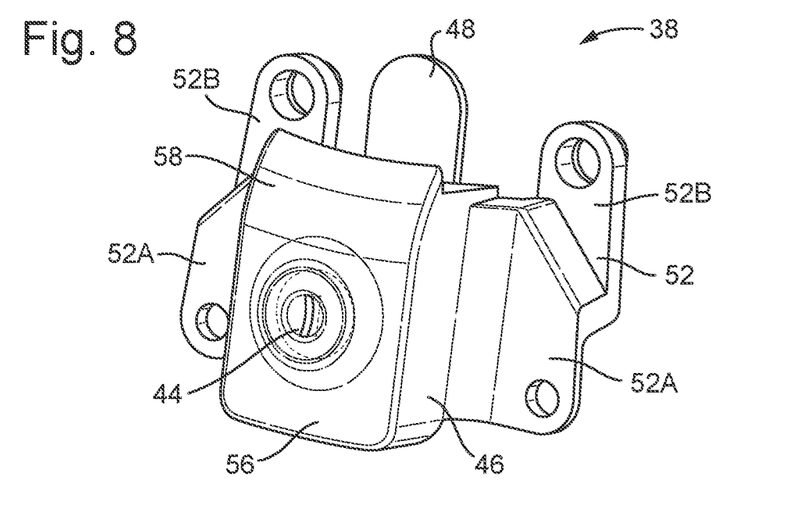
FIG. 8 illustrates the lock in isolation.

FIG. 8 shows the lock 38 in isolation. The illustrated lock 38 includes lock housing 46, and keyhole 44 attached to locking member 48. As discussed above, the lock housing 46 includes flanges 52 for attaching the lock housing 46 to the door 32 of the aircraft galley container 30. The flanges 52 may be set back from the front of the lock housing (46) so as to be fixable behind the front panel 33 of the door 32 of the aircraft galley container 30. In this way, the fasteners 50 are inaccessible, and also not visible from the front of the aircraft galley container 30. As such, they cannot be tampered with to circumvent the lock 38. Moreover, they do not present snagging hazards to the user.

The illustrated flanges 52 include forward flanges 52A and aft flanges 52B stepped from one another, which allows the flanges 52 to be fastened to different parts within the door 32.

The lock housing 46 includes a main body 56 which houses the key hole 44 and which, as illustrated includes a main body front panel 58 including a contoured or curved surface that conforms to the shape of the front panel 33 of the door 32 adjacent to the handle 34, where the lock 38 is positioned.

Figure 9:
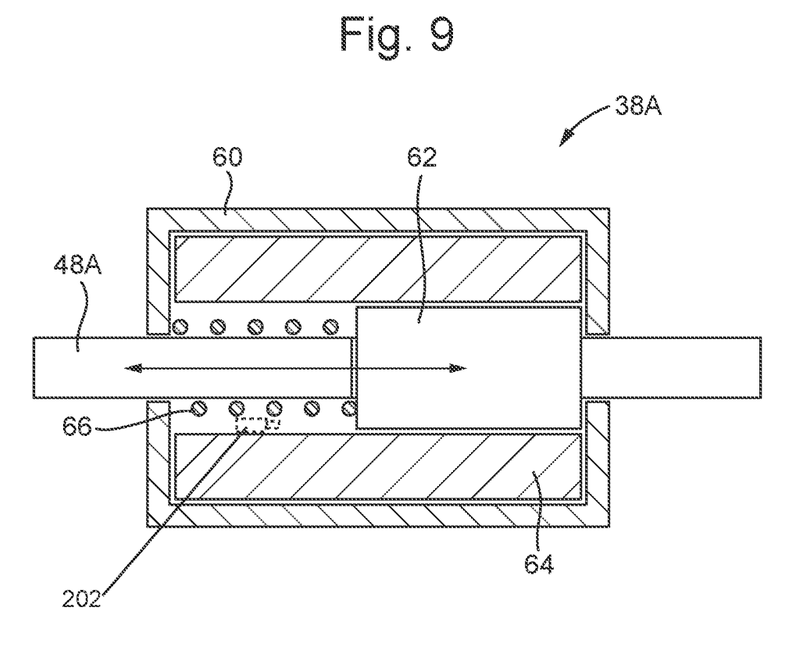
FIG. 9 illustrates another lock in isolation.

FIG. 9 illustrates an alternative lock 38A being in the form of an electronically controlled lock 38A. The electronically controlled lock 38A shown is a linear solenoid actuator, which includes a housing 60 a plunger 62, the plunger 62 being attached to the lock member 48A. Electromagnetic coils 64 are arranged around the plunger 62, which is ferromagnetic. Passing a current through the electromagnetic coils 64 induces an electromotive force which moves the plunger 62, and thus the lock member 48A. A resilient member 66, such as a spring may be included to provide a return force to move the plunger 62, and thus the lock member 48A, back to its original position. This is one example of a lock 38A that is operable remotely that could be used in the present disclosure. As will be appreciated, alternative arrangements, such as stepper motors could be used, and the motion of the lock member 48A could be either linear or rotational, depending on the particular arrangement used.

Figure 10:
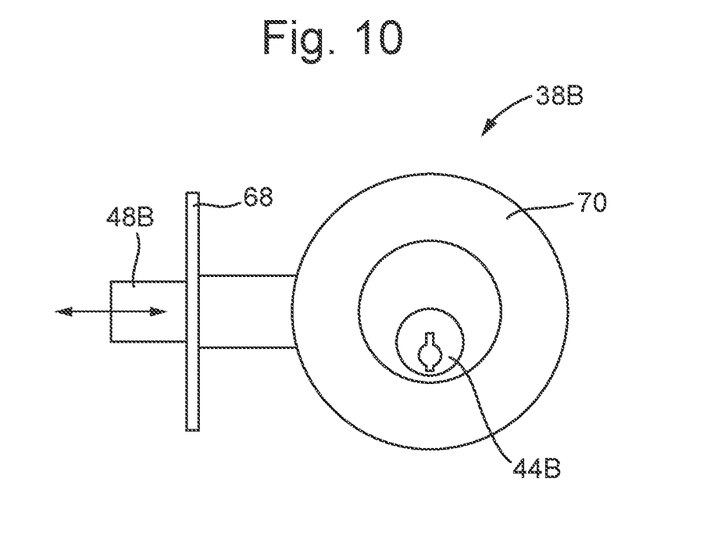
FIG. 10 illustrates yet another lock in isolation.

FIG. 10 illustrates an alternative lock 38B operable manually by the use of a key. The lock 38B is in the form of a deadbolt style lock and has a keyhole 44B, wherein turning of the keyhole 44B with a key results in linear movement of a locking member 48B. The lock 38B as illustrated includes a flange 68 and a lock housing 70, which, as will be appreciated, could be modified to appropriately fit the door panel 102 for attaching the lock 38B to the aircraft galley container 30.

Figure 11:
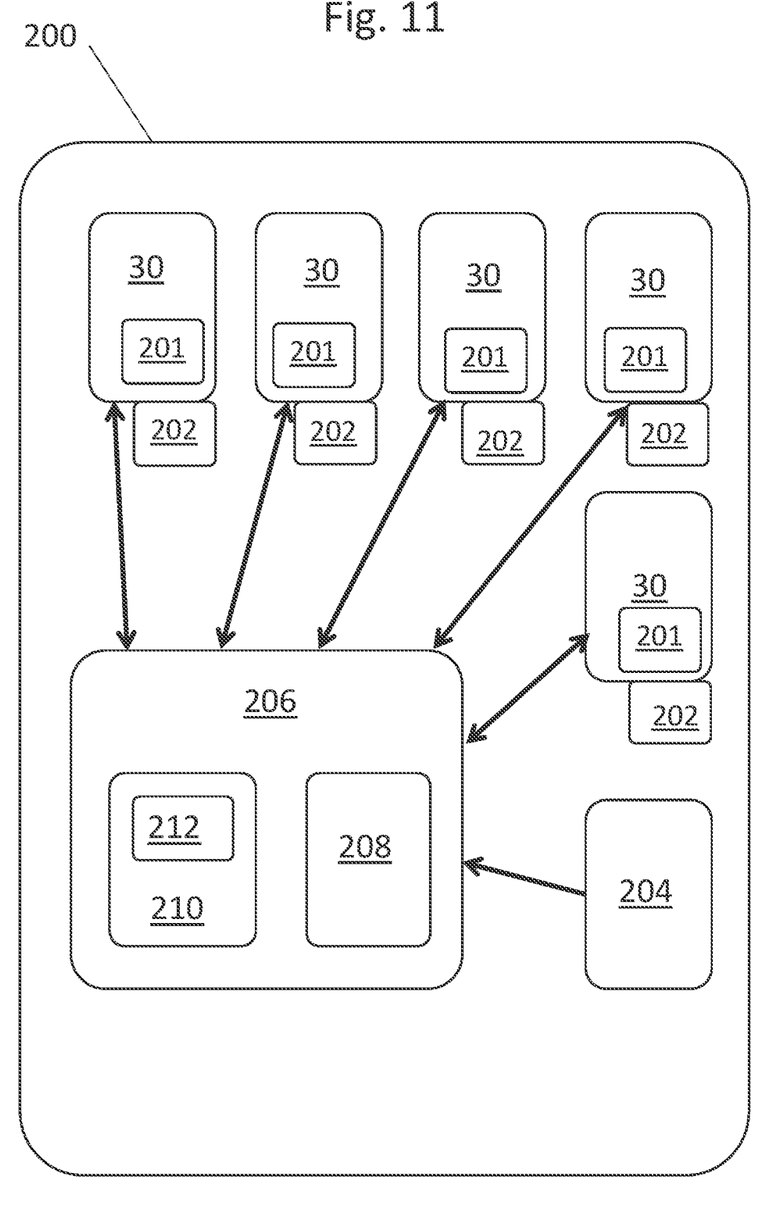
FIG. 11 illustrates a block diagram of a system of aircraft galley containers.
Figure 12:
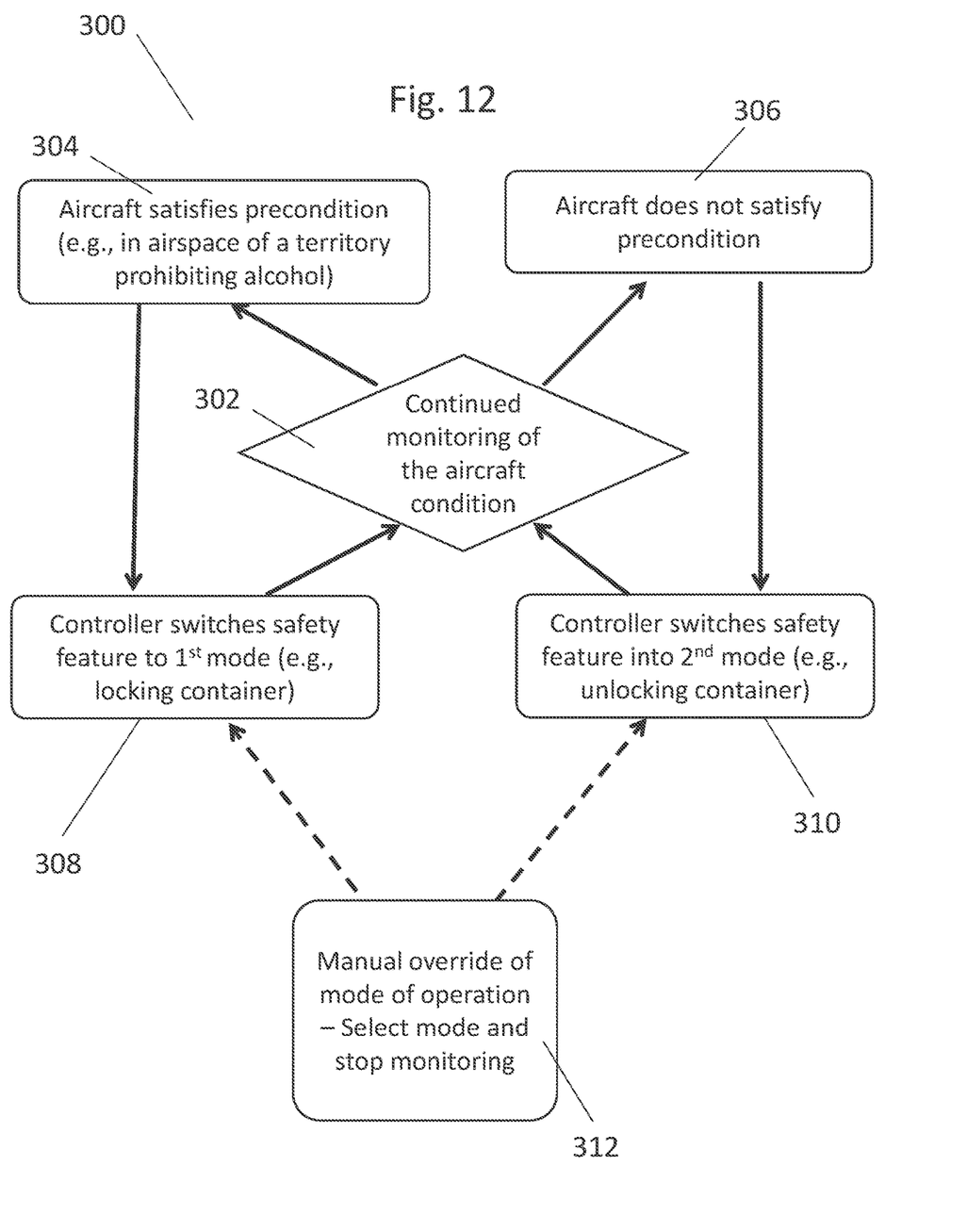
FIG. 12 illustrates a flow chart of a method of selectively locking and unlocking the aircraft galley containers.

Described below with reference to FIGS. 11 and 12 is a system and method, which automates the operation of safety features, such as the locking function above, within aircraft galley containers dependent on external factors, such as the geographical location of the aircraft or the particular flight state that the aircraft is in.

The system and method of FIGS. 11 and 12, when used in conjunction with the locking arrangement described above require an electronically controllable locking mechanism, such as the mechanism of FIG. 9. Alternatively, mechanisms using, for example, a stepper motor could be used.

FIG. 11 shows a block diagram of an aircraft 200 which includes a plurality of aircraft galley containers 30. As will be appreciated, the system could function with only a single aircraft galley container 30 or a different number of aircraft galley containers to the five aircraft galley containers 30 illustrated.

Each of the aircraft galley containers 30 includes a safety feature 201 having a first mode (or mode of operation) and a second mode (or mode of operation). One exemplary safety feature may be the latch and locking mechanism described above, with the first mode being a locked position, where the latch member prevents the rotatable plate from rotation and the second mode being an open position, where the latch member allows rotation of the rotatable plate such that the door may be opened. This and other exemplary safety features 201 and the modes will be described in further detail below in combination with other features of the aircraft 200 and systems therein.

Each of the aircraft galley containers 30 also includes a sensor 202 associated therewith to determine which mode the safety feature is in. for example, when the safety feature 201 is the locking mechanism described herein, the sensor may be a push microswitch located such that when the locking member 48, 48A, 48B is in the location to prevent the rotatable plate 8 from rotation. An exemplary sensor 202 is illustrated in FIG. 9. As will be appreciated, depending on the design of the locking member 48, 48A, 48B, the sensor 202 may be arranged in an alternative location. Other examples of sensor include a laser sensor, or a rotary sensor incorporated into a stepper motor for rotating locking member 48 to determine the position thereof. When the safety feature 201 is an alternative feature to the locking function, corresponding sensors are to be used.

The aircraft 200 includes a controller 206. The controller 206 is able to switch the safety features 201 between the first and second modes, either individually, or collectively. For simplicity only one controller 206 is illustrated, but the aircraft may include multiple controllers 206 operable to control separate safety features 201 is the aircraft galley containers 30. The controller 206 may be part of a device used for electronic controls of other parts of the aircraft, or of the engine thereof. In this way, the controller 206 may have more information related to other parts of the aircraft, such as flight-tracking or GPS data, or the engine conditions related to the flight condition of the aircraft.

The controller 206 includes a processing unit 208 and a memory 210 which has stored therein instructions 212 executable by the processing unit 208. The processing unit 208 may include any suitable devices configured to implement the instructions 212, the instructions 212 including steps for determining which mode the safety feature 201 should be placed in dependent on certain conditions of the aircraft. The processing unit may include, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 210 may include any suitable known or other machine-readable storage medium. The memory 210 may include non-transitory computer readable storage medium, for example, but not limited to, an electronic, magnetic, optical, electromagnetic, infrared, or semiconductor system, apparatus, or device, or any suitable combination of the foregoing. The memory 210 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 210 may include any storage means (e.g., devices) suitable for retrievably storing instructions 212 executable by processing unit 208.

The instructions 212 may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The instructions 212 correspond to the steps of the method discussed below and shown in FIG. 12.

The safety feature 201 is operable to be placed in the first mode if a predetermined condition is met or satisfied. That predetermined condition may be programmable and/or separately from when the aircraft is in use. The predetermined condition could be a variety of conditions, for example particular geographical locations of the aircraft, or a particular stage or set of stages of the aircraft's flight-cycle. The predetermined condition may be different dependent on which safety feature 201 is being implemented. Indeed, a combination of predetermined conditions could be used, either multiple conditions being used to trigger the same safety feature 201 in one or more aircraft galley containers 30, or simultaneously, different predetermined conditions being satisfied or not being used to determine the mode to be used for different safety features 201 in either the same or different aircraft galley containers 30.

The safety feature 201 could be operable to be placed in the second mode if a predetermined condition is met or satisfied. In either case, when the predetermined condition is not met the safety feature 201 is in the other of the modes.

The aircraft may also include an override module 204, by which a user, for example, the pilot may override the determination of which mode the safety features 201 are to be placed in. The override module 204 may be configured such that the user may override a selected number of, or all of the safety features 201. Even if the precondition is met which would place the safety features 201 in the first mode, as discussed below the override module allows the user to select the second mode for one or more of the safety features 201.

A display module may also be provided, either separately to, in place of, or as part of the override module 204. The display module may present to the user, e.g., the pilot, information regarding the status of each of the safety features 201, as well as information regarding the condition of the aircraft, for example, how close to the predetermined condition said condition is.

As mentioned above, a variety of safety features 201 could be used in different embodiments, or indeed a combination of different safety features 201.

One safety feature 201 may correspond to the locking function provided by the lock 38, 38A, 38B selectively preventing rotation of the rotatable plate 8 as described herein. The lock 38, 38A, 38B may be configured to be actuated electronically, either by a solenoid as shown in FIG. 9, or by a rotational stepper motor (or alternative rotational actuator) added thereto in one of the other arrangements, wherein the keyhole 44, 44B may then be omitted. A linear actuator may be used in place of the solenoid illustrated. The linear actuator, in a similar manner to the solenoid can transform electrical current into a linear motion, but has a greater stroke length than the solenoid.

Alternative locking mechanisms, for example an electromagnet which can be turned on to keep the door shut or turned off to keep the door open, may also be used with the aircraft, system and method described with reference to FIGS. 11 and 12.

In combination with such a locking arrangement being the safety feature 201, the predetermined condition which, if satisfied, the safety feature will be placed into the first (i.e., locked) mode may be a set of geographical locations of the aircraft. For example, if the aircraft is within airspace of territories with restrictions on alcohol (or within a certain distance, e.g., 10 miles, from such airspace), the predetermined condition is satisfied and then the safety feature will be switched to the first mode, i.e., the aircraft galley container will be locked. This automatic locking of the aircraft galley containers is appropriate for use of fridges and other containers which contain alcoholic beverages. As a result, the aircraft galley containers do not need to be individually manually locked by aircraft crew members when entering such airspace. Additionally, even compared to remotely operable locking mechanisms, this provides a failsafe in that the pilot (or user remotely operating the locking mechanisms) does not need to remember to switch the locking mechanisms to a locked position when entering the airspace, and into an open position when leaving the airspace.

This function can be switched on or off prior to a flight dependent on whether the aircraft will be landing in a territory having restrictions on alcohol.

Alternatively, the predetermined condition could correspond to the phase of the flight cycle the aircraft is in. For example, it may be desirable that the aircraft galley containers only be open during cruise, to prevent accidental opening from turbulence (or by passengers, either unintentional or intentional) during take-off, landing, climb, descent, or taxiing. In this manner, the precondition could be programmed to correspond to a set of engine parameters or other flight control systems, such as thrust provided, or rotation speed, or the state of flight control surfaces. The instructions in the memory may include details of which engine parameters correspond to which stage of flight so that the controller may determine which flight condition the aircraft is in and so may determine whether the predetermined condition (e.g., that the aircraft is in take-off, landing, climb, descent or taxiing, as opposed to being in cruise) is satisfied, and thereby place the safety feature in the first, i.e., locked mode. When the aircraft is in a cruise condition, and thus the predetermined condition not satisfied, the safety features may be placed in the second, i.e., open, mode, such that the aircraft galley containers are unlocked and the cabin crew are able to serve food and beverages.

The controller may be configured to use either or both of the geographical and flight-stage preconditions above, and may use a combination for different aircraft galley containers, for example, an aircraft galley container that is an oven may not need to be locked when entering certain territories, whereas an aircraft galley container used to store alcoholic beverages may need to be locked.

In an alternative arrangement, the safety feature may correspond to a self-cleaning function of an aircraft galley container that is an oven. This self-cleaning function is often operated immediately after a cooking cycle of the oven, so as to make use of resonant oven heat. However, it is desirable that such a self-cleaning function is not operated during a period of high turbulence, where the self-cleaning could potentially be inefficient, or lead to hazards.

The predetermined condition for a self-cleaning function safety feature could correspond to a turbulence threshold which, when satisfied, causes the controller to switch the self-cleaning function into the second mode, which corresponds to the self-cleaning function being inhibited from operating, or in other words, the self-cleaning function being turned off. The turbulence threshold may be measured as related to a speed change of vertical height of the aircraft in a set time. That is, turbulence causes the aircraft to move up and/or down rapidly, separately from the usual effects of flight control surfaces such as ailerons and flaps etc., meaning that such vertical movement can effectively be measured to determine a measurable degree of turbulence.

In some circumstances, it could be that the self-cleaning function is set up so as to only be used when the aircraft is on the ground (or 'on ground'), whether that be taxiing, or docked at the airport, so that it may be operated by either the ground crew, or cabin crew when they are not needing to perform other duties. Additionally, the self-cleaning functions may not be appropriate to use while the ovens are in use during a flight.

When the safety feature corresponds to such a self-cleaning function set up so as to only be used on ground, the predetermined condition may correspond to the aircraft being 'on ground'. When the aircraft is 'on ground' the safety feature may be switched to a first mode, i.e., a cleaning mode, and when the aircraft is in the air, the safety feature may be switched to a second mode, which corresponds to not cleaning, i.e., a standby, or an 'off' mode.

In a similar embodiment, the safety feature may be a device inhibiting such a self-cleaning function. In this embodiment, the precondition may still be the aircraft being 'on ground', yet, when the precondition is met, the first mode, into which the safety feature is placed is an 'off' mode, where the inhibiting device allows the self-cleaning, and in the second mode, when the precondition is not satisfied, the safety feature is placed in an 'on' mode, and thereby inhibits the self-cleaning. In this embodiment, cabin or ground crew still switch the self-cleaning function on, but they are prevented from doing so when it would be inappropriate.

Another alternative safety feature could be a cut-off for heating elements within ovens, which may be switched on to prevent heating in a first mode, and switched off to allow heating in a second mode. In one example thereof, the predetermined condition could correspond to a turbulence threshold which, when satisfied causes the controller to switch the cut-off into the second mode, cutting off the heat provided for the ovens to mitigate risk provided by turbulence. As mentioned above, a turbulence threshold may correspond to a certain amount of vertical movement of the aircraft in a set time, separate from the expected vertical movement expected from the aircraft controls.

As will be appreciated, a variety of safety features associated with aircraft galley containers (whether those containers be ovens, fridges, or containers without either a heating or cooling function) may be used with this arrangement, and their operation be determined by a variety of different, or combinations of, predetermined conditions.

Illustrated in FIG. 12 is a flow chart, showing a method 300 of operation of the safety features 201 and controller 206 used in the aircraft 200 of FIG. 11.

The method 300 includes a continued step 302 of monitoring an aircraft condition. That aircraft condition may correspond to a particular condition, such as the geographical location of the aircraft, which could be monitored by a GPS receiver, or similar device. Alternatively, the aircraft condition could correspond to a flight condition of the aircraft, which may include various combinations of features such as engine power inputs and outputs, the state of various flight control surfaces, and feedback from other sensors regarding flight data. A combination of these, and other sources of data may be provided regarding the aircraft condition.

Steps 304 and 306 are alternative steps indicating respectively that the aircraft satisfies a particular precondition, or that the aircraft does not satisfy that precondition. The nature of the precondition is described above, and may be chosen based on the particular safety feature being used.

Steps 308 and 310 correspond to the action of the controller to switch the safety feature into either the first mode or the second mode respectively, dependent on the precondition being satisfied or not. For example, in one embodiment as discussed above, if the aircraft is in the airspace of a territory prohibiting alcohol, the precondition is satisfied and so the controller switches the safety feature into the first mode by operating the lock to prevent the rotation of rotatable plate, thereby locking the door to the aircraft galley container. It will be appreciated that is the safety feature is already in the first mode, the controller would maintain the safety feature in the first mode. The process continues with the aircraft condition continuing to be monitored.

An optional step 212 of manually overriding the mode in which the safety feature is placed is also illustrated. Should the pilot, or another appropriate user, determine it is suitable, then they may use an override function, such as that provided by the override module 204 of FIG. 11, to manually select the mode of the safety feature, irrespective of the predetermined condition being met or not. Additionally to placing the safety feature in the desired mode, the override function will also pause the monitoring of the aircraft condition by the controller, to ensure that the system is not inadvertently placed into the other mode based on the predetermined condition being satisfied or not. This pausing of the monitoring of the aircraft condition may be time limited, so that after a set period of time, for example from 2 minutes to 30 minutes, e.g., 10 minutes, the system reverts to monitoring the aircraft condition and selecting a mode based on whether the predetermined condition is met. Alternatively, the pausing of the monitoring of the aircraft condition may be dependent on an input provided by the pilot or other appropriate user to stop overriding the automatic functioning of the system. That is, in this arrangement, if the pilot or other appropriate user decides to override the system, it is a permanent override, until they turn the override off.

What is claimed is:

1. An aircraft comprising:
at least one aircraft galley container, each one of the at least one aircraft galley container including a safety feature having a first mode and a second mode; and
a controller for automatically selecting one of the first mode or the second mode of the safety feature and placing the safety feature in a selected mode,
wherein the automatic selection of the first mode or the second mode is dependent on a condition of the aircraft satisfying or failing to satisfy a predetermined condition, wherein each of the at least one aircraft galley container comprises:
a door;
a latch mechanism, wherein the latch mechanism is positionable in a latched position preventing opening of the door and an unlatched position permitting opening of the door, wherein the latch mechanism includes:
a handle;
a pair of rods; and
a rotatable plate coupled to the handle and configured to be rotated by the handle and to convert rotational movement of the handle to linear movement of the pair of rods to place the latch mechanism in the latched and unlatched positions; and
a lock configured to selectively prevent the rotatable plate from rotation to maintain the latch mechanism in the latched position,
wherein the lock comprises a locking member,
wherein the rotatable plate comprises a recess shaped to conform to the locking member,
wherein, in a locked position, the lock prevents the rotatable plate from rotation by the locking member engaging with the recess, and
wherein, in an open position, the lock permits the rotatable plate to rotate by the locking member disengaging with the recess.

2. The aircraft of claim 1, wherein the at least one aircraft galley container includes a plurality of aircraft galley containers.

3. The aircraft of claim 1, wherein the the latch mechanism is a remotely operable latch mechanism, wherein the first mode includes the locked position of the latch mechanism and the second mode includes the open position of the latch mechanism.

4. The aircraft of claim 3, wherein the predetermined condition includes a predetermined set of geographical locations of the aircraft.

5. The aircraft of claim 3, wherein the predetermined condition includes a flight state including docked, taxiing, take-off, climb, descent, landing, and cruise states, wherein the predetermined condition is satisfied when the aircraft is in one of the taxiing, take-off, climb, descent, and landing states and the predetermined condition is not satisfied during the docked and the cruise states.

6. The aircraft of claim 1, wherein the at least one aircraft galley container is an oven and the safety feature includes a self-cleaning module for the oven, wherein the first mode includes the self-cleaning module being operable and the second mode includes the self-cleaning module being inhibited.

7. The aircraft of claim 6, wherein the predetermined condition includes a turbulence threshold of the aircraft.

8. The aircraft of claim 1, further including a sensor for determining which mode the safety feature is in, and a display module for indicating to a user which mode the safety feature is in.

9. The aircraft of claim 1, comprising a manual input configured to override the controller when a user provides an input signal.

10. A method of operating at least one safety feature associated with a respective at least one aircraft galley container, the method comprising:
   determining whether an aircraft satisfies a predetermined condition;
   responsive to aircraft satisfying the predetermined condition, placing a safety feature of at least one aircraft galley container in a first mode, wherein in the first mode, a lock prevents a rotatable plate from rotation by a locking member engaging with a recess in the rotatable plate; and
   responsive to aircraft failing to satisfy the predetermined condition, placing the at least one safety feature of the at least one aircraft galley container in a second mode, wherein, in the second mode, the lock permits the rotatable plate to rotate by the locking member disengaging with the recess in the rotatable plate.

11. The method of claim 10, wherein the at least one aircraft galley container includes a plurality of aircraft galley containers, and the steps of placing the at least one safety feature of the at least one aircraft galley container in the first mode and the second mode includes placing safety features of each of the plurality of aircraft galley containers in the first mode and the second mode respectively.

12. The method of claim 10, wherein the at least one safety feature includes a remotely operated locking arrangement, the first mode includes a locked condition of the remotely operated locking arrangement, and the second mode includes an open condition of the remotely operated locking arrangement.

13. The method of claim 12, wherein the predetermined condition includes a set of geographical locations of the aircraft.

14. The method of claim 10, wherein the at least one aircraft galley container is an oven and the at least one safety feature includes a self-cleaning module for the oven, wherein the first mode includes the self-cleaning module being on and the second mode includes the self-cleaning module being off, wherein the predetermined condition includes turbulence threshold of the aircraft.

* * * * *